(12) United States Patent
Kennedy et al.

(10) Patent No.: US 6,690,454 B2
(45) Date of Patent: Feb. 10, 2004

(54) METHOD, APPARATUS AND SYSTEM FOR TESTING ONE OR MORE WAVEGUIDES OF AN OPTICAL DEVICE

(75) Inventors: William P Kennedy, Loveland, CO (US); Amanda J Price, Loveland, CO (US); Max Seminario, Fort Collins, CO (US); John Bernard Medberry, Windsor, CO (US)

(73) Assignee: Agilent Technologies, Inc., Palo Alto, CA (US)

( * ) Notice: Subject to any disclaimer, the term of this patent is extended or adjusted under 35 U.S.C. 154(b) by 0 days.

(21) Appl. No.: 10/135,481

(22) Filed: Apr. 29, 2002

(65) Prior Publication Data

US 2003/0202171 A1 Oct. 30, 2003

(51) Int. Cl.⁷ .............................................. G01N 21/00
(52) U.S. Cl. ..................................................... 356/73.1
(58) Field of Search ............................... 356/73.1, 364, 356/366, 367

(56) References Cited

U.S. PATENT DOCUMENTS 6,147,757 A * 11/2000 Shen et al. ................. 356/364
6,204,924 B1 * 3/2001 Cyr .............................. 356/453
6,449,033 B2 * 9/2002 Marro et al. ................ 356/73.1
6,552,836 B2 * 4/2003 Miller .......................... 359/237

* cited by examiner

Primary Examiner—Richard A. Rosenberger
Assistant Examiner—Vincent P. Barth

(57) ABSTRACT

A measurement system is provided that is capable of analyzing light at the input of an optical waveguide of an optical device under test (DUT) and/or at the output of the waveguide, preferably at both. At the input of the waveguide, light having a particular polarization state generated by a polarization controller is output from the polarization controller and coupled into a proximal end of an optical fiber. The measurement system analyzes the polarization state of the light being launched from the opposite, or distal, end of the optical fiber into the waveguide input of the DUT to determine whether and by how much the polarization state of the light has been changed by the optical fiber. The polarization controller is altered, if necessary, to compensate for any changes in the polarization state caused by the optical fiber so that the polarization state of light being launched into the input of the optical fiber is known and is controllable. At the output of the waveguide, the measurement system analyzes the polarization state of the light output from the waveguide to determine any effect the waveguide of the DUT had on the polarization state of the light that propagated through the waveguide.

36 Claims, 5 Drawing Sheets

METHOD, APPARATUS AND SYSTEM FOR TESTING ONE OR MORE WAVEGUIDES OF AN OPTICAL DEVICE

TECHNICAL FIELD OF THE INVENTION

The present invention relates generally to optical devices and, more particularly, to a method, apparatus and system for testing one or more waveguides of an optical planar lightwave circuit device to determine any effect a waveguide may have on the polarization state of light launched into it.

BACKGROUND OF THE INVENTION

Planar Lightwave Circuit (PLC) devices often have unintended effects on the polarization states of the light propagating through them. Understanding and quantifying these effects in a real-time manner enables better designs of PLC devices to be achieved. Polarization Extinction Ratio (PER) is a measure of the ratio of the electric field amplitude of one polarization state to the electric field amplitude of the other polarization state (e.g., the ratio between the horizontal and vertical polarization components where the components are orthogonal to each other). With respect to PLC devices, the polarization state is typically thought of in terms of a state that is parallel to the substrate of the PLC device, which is typically referred to as the horizontal component, and a state that is perpendicular to the substrate, which is typically referred to as the vertical component. In this case, the PER is the ratio between the horizontal polarization component and the vertical polarization component.

As stated above, a PLC device can have an unexpected effect on the polarization states of the signals propagating through the device. Some of these effects include, for example, scrambling of the polarization states and shifting of the center wavelength within the PLC device, which are both undesirable effects. In the case of an optical demultiplexer PLC, for example, slight shifting of the center wavelength on each channel has been observed.

A known technique for testing a PLC device to determine its effects on the polarization state of light passing through them involves: 1) launching light from a polarization controller into the input of the waveguide of PLC device via a length of optical fiber connected to the polarization controller; 2) receiving the light output from the output of the waveguide of the PLC; and 3) measuring the effects caused by the PLC on the polarization state of the light output from the waveguide. This technique assumes that the polarization state of the light being launched from the end of the optical fiber into the input of the waveguide is the same as the polarization state of the light being output from the polarization controller. In other words, this technique assumes that the optical fiber does not affect the polarization state of the light between the point where the light leaves the polarization controller and the time when the light is launched from the end of the optical fiber into the waveguide input.

U.S. Pat. No. 5,371,597 (hereinafter the "'597 patent") discloses a system and method for using a deterministic method for computing polarization dependent loss. The technique requires four unique input states of polarization in order to compute the polarization dependent loss of an optical device under test (DUT). This patent assumes that each of the four states of polarization, once selected, will be maintained over the length of optical tap, i.e., from the end of the optical tap connected to the polarization controller to the input of the DUT. Therefore, changes in polarization state caused by the optical tap itself are not taken into consideration.

In accordance with the present invention, it has been determined that the state of polarization of light can change between the polarization controller and the end of the optical fiber from which light is launched into the PLC DUT due to a number of variables such as, for example, the type of optical fiber used, the length of the optical fiber used and/or spatial movement of the optical fiber, etc. All of these factors can contribute to the uncertainty of the polarization state of the light at the end of the optical fiber from which light is launched into the PLC device.

Accordingly, a need exists for a method and apparatus that enable the polarization state of light being launched from the end of the optical fiber into the PLC DUT to be measured so that the polarization state of the light launched from the optical fiber end into the PLC can be adjusted, if necessary, to have the proper, or desired, polarization state for testing the DUT. A need also exists for such a device that will enable the polarization state (e.g., the PER and/or PDL) of light output from the waveguide to be determined in order to determine any effects the waveguide had on the polarization state of light that propagateed through it.

SUMMARY OF THE INVENTION

The present invention provides a measurement system that is capable of analyzing light at the input of an optical waveguide of an optical device under test (DUT) and/or at the output of the waveguide, preferably at both. At the input of the waveguide, light having a particular polarization state generated by a polarization controller is output from the polarization controller into an end of an optical fiber. The measurement system analyzes the polarization state of the light being launched from the opposite end of the optical fiber to be into the waveguide input of the DUT to determine whether and by how much the polarization state of the light has been changed by the optical fiber. The polarization controller is altered, if necessary, to compensate for any changes in the polarization state caused by the optical fiber. At the output of the waveguide, the measurement system analyzes the polarization state of the light output from the waveguide to determine any effect the waveguide of the DUT had on the polarization state of the light that propagated through it.

In accordance with the preferred embodiment, at the end of the optical fiber furthest from the polarization controller, light being output from the end of the optical fiber is captured and analyzed by the measurement system. In particular, a computer of the measurement system executes one or more algorithms that determine the polarization extinction ration (PER) and/or the polarization dependent loss (PDL) associated with the light output from the end of the optical fiber and determines, based on one or both of these measurements, whether or not the polarization controller needs to be adjusted to compensate for changes in the polarization state of light caused by the optical fiber. If a determination is made that the polarization controller needs to be adjusted, feedback signals generated by the computer are provided to the polarization controller to cause it to adjust the polarization state of the light it is generating to compensate for changes in the polarization state caused by the optical fiber.

At the output of the waveguide, light being output from the waveguide is captured and analyzed by a measurement system. In particular, a computer of the measurement system executes one or more algorithms that analyze the polarization state of the light exiting the waveguide and determine any effect the waveguide of the DUT had on the polarization state of the light launched into the waveguide. This determination may be used for the purpose of, for example, determining whether the waveguide of the DUT is operating properly. As in the case of light output from the distal end of the optical fiber, in this case the PER and/or PDL may be determined and analyzed to determine any effect the waveguide may have had on the polarization state of light that propagated through it.

The measurement system of the present invention that is used to analyze the light being output from the distal end of the optical fiber comprises a polarization controller, a lens, a beam splitter, first and second optical sensors, and processing logic. The polarization controller generates a beam of light having a particular polarization state. The beam of light is coupled into the proximal end of the optical fiber. The lens receives the light output from the distal end of the optical fiber and focuses the light on a beam splitter, which separates the beam of light into first and second polarization components. The polarization components may be orthogonal or non-orthogonal to each other (i.e., they may be 90° apart or have some other angle between them, or the light may be circularly polarized). The first optical sensor is positioned to receive the first polarization component from the beam splitter and to convert the light into corresponding electrical signals. The second optical sensor is positioned to receive the second polarization component from the beam splitter and to convert the light into corresponding electrical signals.

The processing logic, which includes the computer and other circuitry, receives the electrical signals from the first and second sensors and processes the electrical signals in a particular manner to make the electrical signals suitable for processing by the computer. The computer processes the electrical signals in accordance with a measurement algorithm. The processing logic determines the polarization state of the light output from the distal end of the otical fiber and, if necessary, provides a compensation feedback signal to the polarization controller to cause it to adjust the polarization state of the light it is launching into the proximal end of the optical fiber. This enables the polarization state of the light being launched from the distal end of the optical fiber into the input of the waveguide to be known and to be controlled.

For light being output from the output of the waveguide, the measurement system comprises the same elements as the measurement system described above, except for the polarization controller. The computer of the processing logic of this measurement system analyzes the light to determine whether the waveguide of the DUT has modified the polarization state, and if so, to what degree. From this analysis, a determination can be made as to any effect that the waveguide had on the polarization state of the light that propagated through it. In this case, the computer also determines the PER and/or the PDL and uses these determinations to determine any effect the waveguide had on the polarization state of the light that propagated through it.

The reason for measuring the ratio between the polarization components (e.g., the PER) is for the purpose of normalizing the data being analyzed. This allows a determination to be made as to the effect that the waveguide has on the polarization state of the light passing through it by comparing the polarization ratio at the input of the waveguide to the polarization ratio of the light at the output of the waveguide, without having to take into account any coupling loss attributable to the DUT.

It is not necessary that the measurement systems that analyze the light at the distal end of the optical fiber and at the output of the waveguide be exclusive of one another. One or more components of each of the systems may be shared amongst the systems. In fact, the combination of the two measurement systems could be viewed as a single measurement system that shares components where possible or desirable, such as, for example, the computer that executes the measurement algorithms to make the aforementioned determinations. However, for ease of illustration and discussion, the present invention will be described as if two totally separate measurement systems are used.

These and other features and advantages of the present invention will become apparent from the following description, drawings and claims.

DETAILED DESCRIPTION OF THE PREFERRED EMBODIMENT

Figure 1:
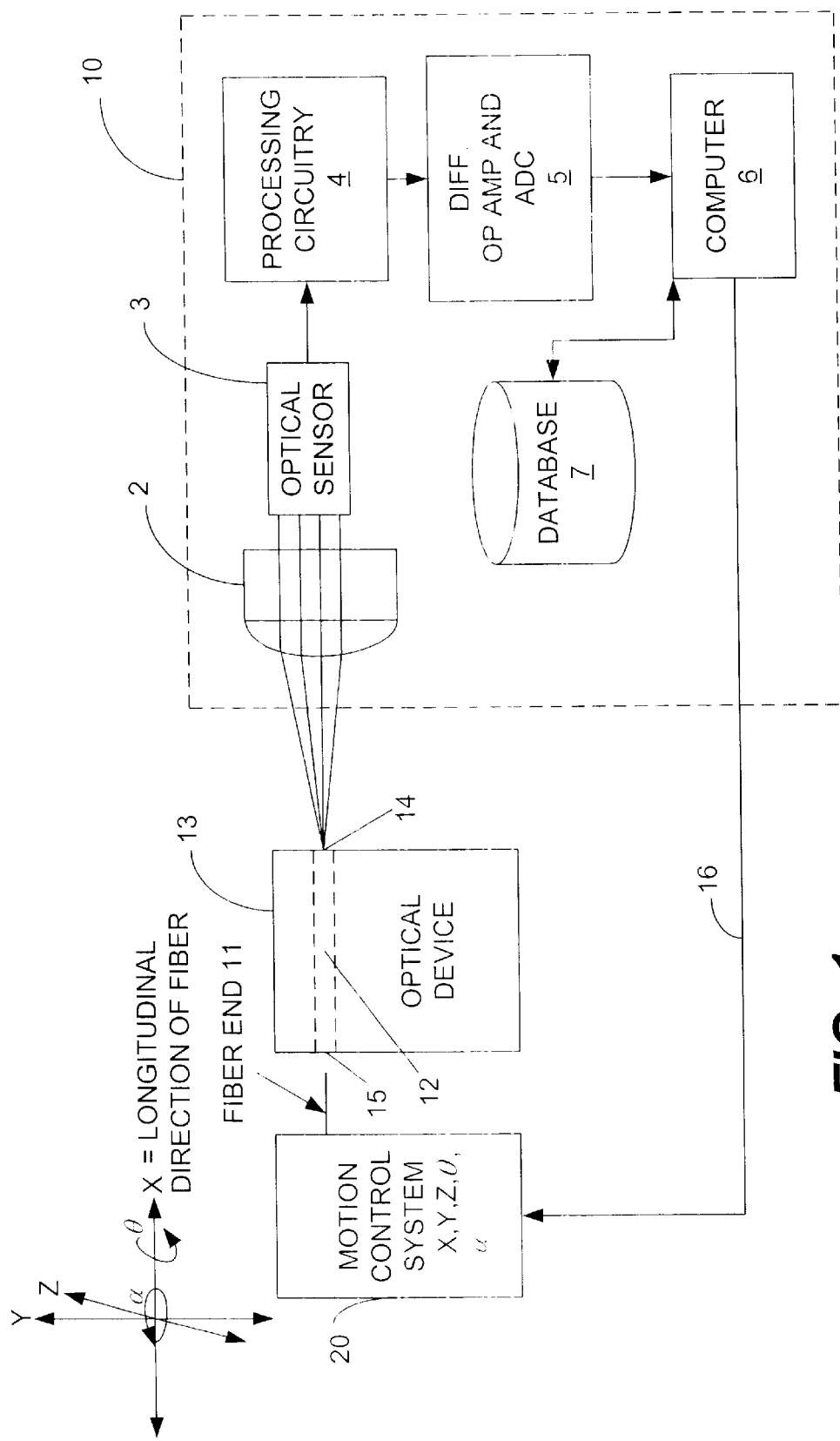
FIG. 1 is a block diagram of an example of an alignment system that can be used to align the end of an optical fiber with the input of a waveguide of a DUT to enable the measurement system of the present invention to obtain accurate measurement data.

The present invention preferably measures the ratio between the polarization components to obtain the PER and/or determines the polarization-dependent loss (PDL) at both the end of the optical fiber from which light is coupled into the input of an optical waveguide and at the output of the optical waveguide. Light having a particular polarization state is generated by a polarization controller and coupled into a proximal end of the optical fiber. A polarizing beamsplitter separates the polarization components of the light such that they propagate along separate paths. The polarization components may be orthogonal or non-orthogonal to each other. The light may also be circularly polarized. Then, a respective optical sensor disposed along each path measures the optical power on its path and converts the corresponding optical signals into electrical signals. Due to the configuration of the system, these measurement and conversion tasks are capable of being performed substantially simultaneously for each path. This allows meaningful information to be derived through an analysis of the electrical signals corresponding to each of the separated components in real time. These functions preferably are performed at both the distal end of the optical fiber and at the output of the waveguide being tested.

The selection of the beam splitter will likely directly affect the depth of the extinction ratio measured. Therefore, a high quality beam splitter is preferred, such as a Glan-Thompson beam splitter, or a similar type of beam splitter, that enables 30-decibel (db) extinction ratio measurements to be obtained. Although this is not necessary, it is preferred in order to ensure that the measurements are very accurate.

As stated above, in accordance with the present invention, the power in each of the polarization states is measured at both the input of the waveguide (i.e., at the distal end of the optical fiber) and at the output of the waveguide. The measurement made at the input of the waveguide of the DUT is used to generate and send feedback signals to the polarization controller to cause the polarization controller to adjust the polarization state of the light being output from it so that the polarization state of the light being launched from the end of the optical fiber into the input of the waveguide of the PLC DUT is proper, known and controllable. The measurement made at the output of the waveguide of the PLC DUT is for the purpose of determining how the PLC DUT affects the polarization states. This may be done for the purpose of, for example, determining whether a particular PLC or batch of PLCs of a particular type are suitable for shipment to customers.

Prior to obtaining these measurements, the optical fiber connected to the polarization controller should be aligned with the input of the optical waveguide of the PLC DUT. Therefore, before the method and apparatus of the present invention are discussed, the manner in which alignment is accomplished will be described with reference to FIGS. 1 and 2. It should be noted that many alignment systems exist that can be used to perform this task and that such systems are generally suitable for use with the present invention. The alignment system discussed below is merely an example of one way for performing this task. It should also be noted that the measurements obtained at the distal end of the optical fiber may be performed without the need to first align the fiber with the waveguide. In order to increase the robustness of the measurement system of the present invention, preferably alignment takes place so that later movement of the optical fiber will not affect the PER and or PDL of light being launched into the optical fiber.

Figure 2:
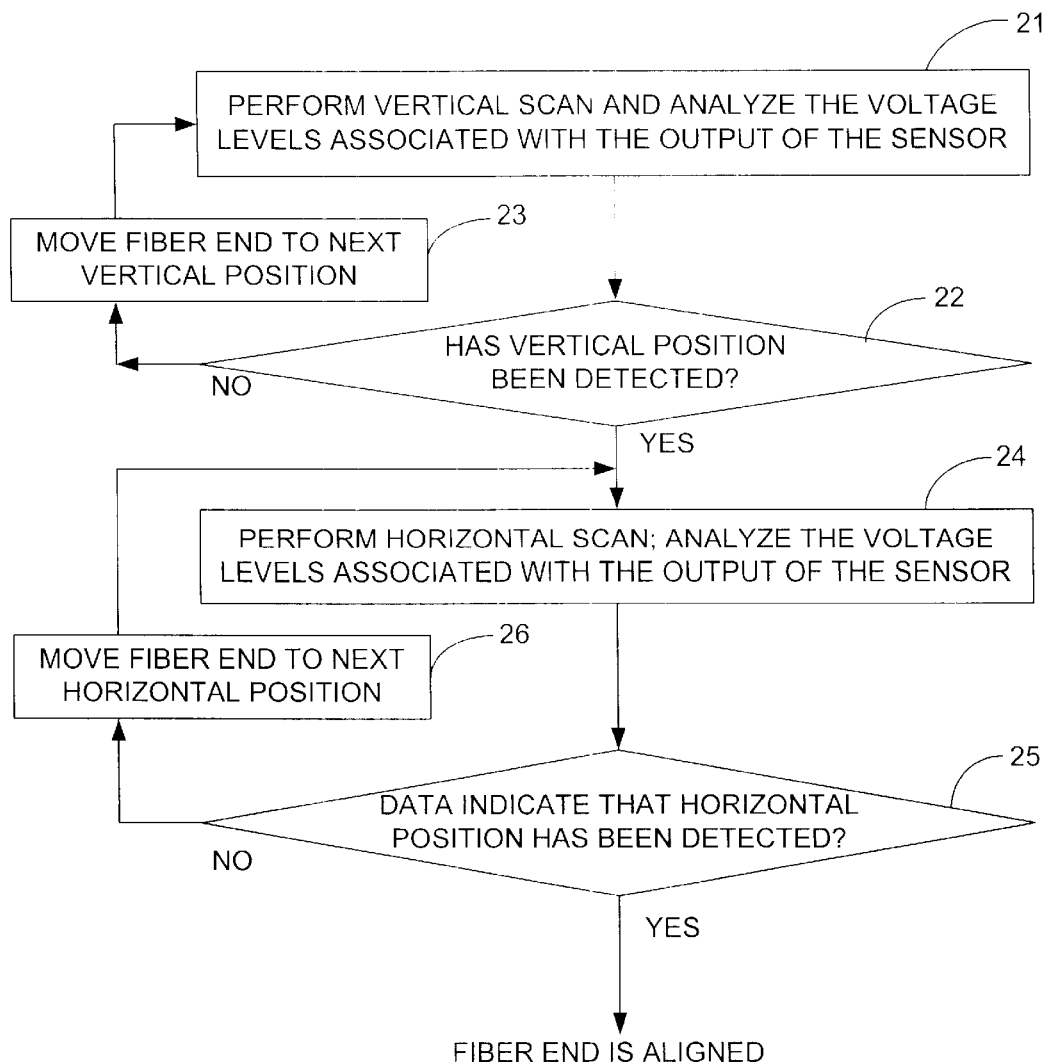
FIG. 2 is a flow chart illustrating the method used by the alignment system of FIG. 1 to align the end of the fiber with the input of the waveguide of the DUT in order to measure the polarization state of light being output from the end of an optical fiber aligned with the input of the waveguide.

FIG. 1 is a block diagram of the alignment system 10. FIG. 2 is a flow chart that demonstrates the alignment algorithm that is performed by the system 10 in combination with the motion control system 20 to align the end 11 of the optical fiber with the input 15 of the waveguide 12. The alignment system 10 generates feedback signals that are provided to a motion control system 20, as represented by line 16 from the alignment system 10 to the motion control system 20. The motion control system 20 preferably is a five-axle motion control system comprising a stage (not shown) that is controlled by the five respective linear drive motors (not shown) that enable the end 11 of the optical fiber to be moved in the X, Y and Z planes and to be rotated in two planes, as indicated by the symbols θ and α. The symbol θ corresponds to rotation of the optical fiber about its longitudinal axis (in this case, the X-axis), which is commonly referred to as the "roll". The symbol α, which represents the "yaw", corresponds to rotation of the longitudinal axis of the optical fiber in the X, Y plane about the Z-axis.

The linear drive motors of the motion control system 20 interface with a processor (not shown) that controls the motion of the five axles via their respective motors and records their respective positions. The processor of the motion control system 20 receives the feedback signals output from the computer 6 and controls the motion of the axles in accordance with the feedback signals. Motion control systems are known that can perform these tasks and that are suitable for this purpose. FIG. 1 merely represents an example of a motion control system that is suitable for aligning the fiber end 11.

In this example embodiment, the alignment system 10 comprises a lens 2, an optical sensor 3 and processing logic, which includes processing circuitry 4, a differential operational amplifier and analog-to-digital converter (ADC) 5, a computer 6 and a memory element 7. The lens 2 may be, for example, a plano-convex lens. The lens 2 receives light projected from the end 14 as it propagates through optical waveguide 12 of the DUT 13. As the light leaves the output 14 of the optical waveguide 12, the light forms a cone-shaped beam, which the lens 2 collimates onto the optical sensor 3. The optical sensor 3 may be, for example, a photodiode.

The optical sensor 3 produces an electrical signal that is related to the amount, or intensity, of light impinging on it. The electrical signals produced by the optical sensor 3 are output to processing circuitry 4. The processing circuitry 4 amplifies the signals to a suitable gain and filters noise out of the signal. The differential op amp and ADC circuitry 5 receives the amplified and filtered differential analog signal and converts it into a digital signal for processing by computer 6. The computer 6 may use data stored in the memory element 7 in combination with the digital signal received from the ADC 5 to determine whether the fiber end 11 is aligned with the input 15 of the optical waveguide 12. The computer 6 outputs feedback signals, which are represented by line 16, to the motion control system 20, which adjusts the spatial position of the end 11 of the optical fiber in accordance with the received feedback signals.

As stated above, the flow chart of FIG. 2 functionally illustrates the alignment algorithm. Because the DUT is typically a multi-layered device, the layer in which the waveguide resides should be determined first (i.e., prior to determining the horizontal location of the waveguide within the layer). To locate the layer in which the waveguide resides, the motion control system 20 performs at least one vertical scan with the end 11 of the optical fiber, as indicated by block 21 of FIG. 2. The scanning operations may occur within a small window of movement, which may be, for example, 50 micrometers (microns) in width in the X plane and 200 microns in height in the Y plane. This window depends on the size of the DUT and other implementation details associated with the configurations of the alignment and motion control systems.

Generally, the computer 6 executing the alignment algorithm analyzes the voltage levels and determines when a peak voltage has been detected, as indicated by block 21 in FIG. 2. Until this peak voltage is detected, the vertical scan continues and the alignment algorithm continues to analyze the voltage levels to find the peak at different vertical positions, as indicated by blocks 22 and 23 in FIG. 2. When the computer 6 determines that this peak voltage has been detected, the fiber end 11 is maintained by the motion control system at the Y position corresponding to the peak. Once the layer in which the waveguide exists has been detected, then a horizontal scan is performed to determine the precise location of the waveguide within the waveguide layer, as indicated by block 24 in FIG. 2. The horizontal scan may be from one end of the DUT to the other in the X plane, or within a smaller window. The voltage level may vary by a small amount over a number of X positions, but one peak voltage will be greater than all of the others and will correspond to the X position of the waveguide. Since a number of voltage peaks may be detected, with only one corresponding to the X position of the waveguide, the alignment algorithm may continue to analyze the voltage level data until the actual peak that corresponds to the X position of the waveguide has been detected, as indicated by blocks 25 and 26.

Figure 3:
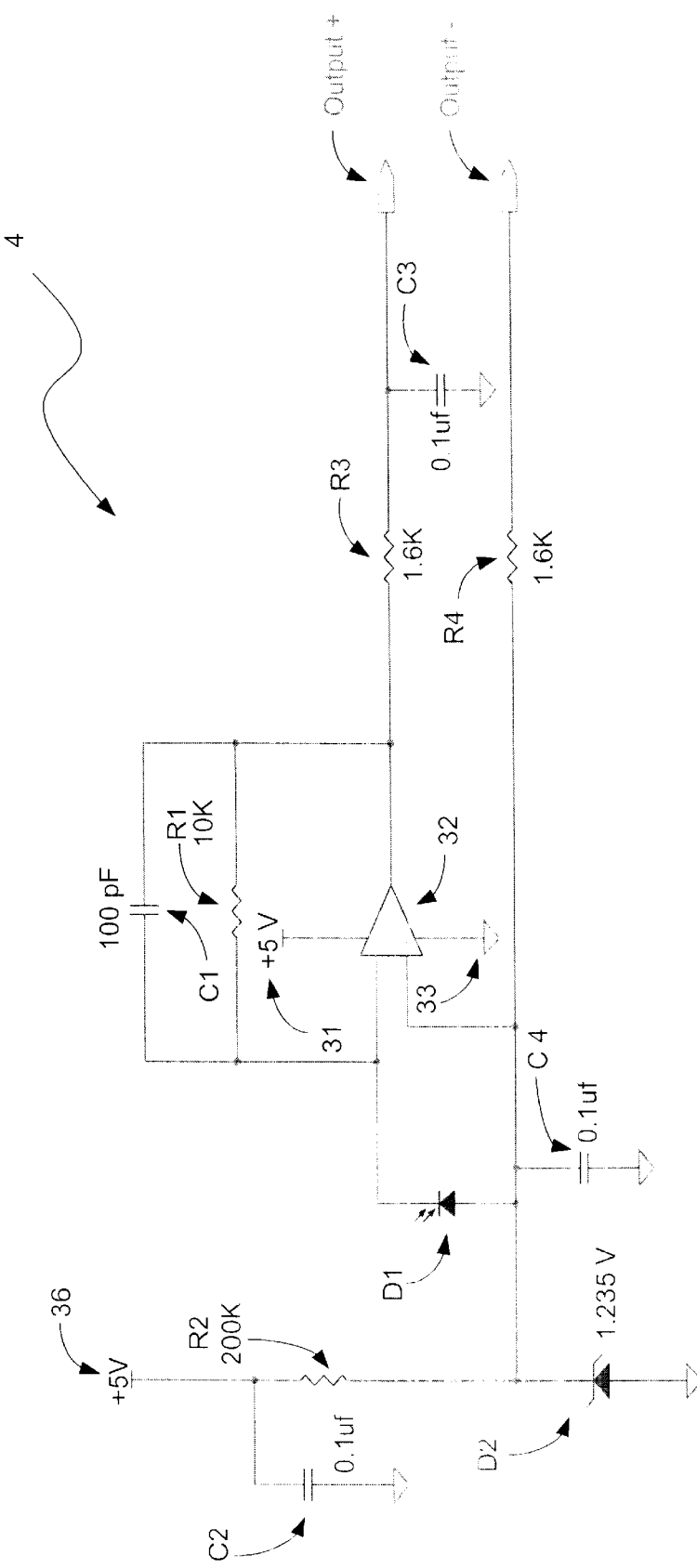
FIG. 3 is a schematic diagram of the processing, circuitry of the measurement system of the present invention in accordance with an example embodiment.

FIG. 3 is a schematic diagram of the processing circuitry 4 shown in FIG. 1 for the alignment system, which also corresponds to the preferred embodiment for the processing circuitry of the measurement system of the present invention described in detail below with reference to FIGS. 4 and 5. The processing circuitry 4 performs three primary functions, namely, filtering noise, preventing saturation and providing the output signals from the optical sensor 3 with sufficient gain to be converted by the OP Amp/ADC 5 into a digital signal that is suitable for processing by the computer 6. The circuitry 4 shown in FIG. 3 has been specifically configured to 1) provide a wide dynamic range (i.e., prevent saturation) for the output of the optical sensor 3 so that voltage levels within a broad range can be digitized into high-resolution digital numbers that contain a large amount of meaningful information, 2) to provide a low noise floor, and 3) to eliminate or reduce noise in the optical sensor output signal and 4) to be capable of being implemented at low cost and with only one power supply. The dynamic range of the combination of the optical sensor 3 and processing circuitry 4 should be greater than the extinction ratio of the beam splitter to prevent information from being lost. For example, the dynamic range of the beam splitter may be, for example, 30 db, whereas the dynamic range of the combination of the optical sensor 3 and processing circuitry 4 may be, for example, 33 db.

The ADC 5 may be, for example, a 16-bit ADC, which is capable of converting a wide range of analog voltage levels into 16-bit digital values. D1 represents the optical sensor 3 shown in FIG. 1, and preferably is a photodiode operating in the photovoltaic mode. The amplifier 32 is an operational amplifier having a very low bias current and a very low offset voltage. This provides the circuitry with a very broad dynamic range. This means that the processing circuitry 4 is capable of detecting the low output voltages of the optical sensor and of amplifying them to a suitable level, but prevents the amplifier 32 from going into saturation when the optical sensor outputs high voltages, such as when a waveguide is detected. Therefore, when a waveguide is being detected, but the fiber end is not precisely aligned with the waveguide, the amplifier 32 will not saturate, but will continue to have a voltage level proportional to the amount of light being received thereby. This enables very precise alignment to be achieved.

The current output from the photodiode D1 is proportional to the amount of light impinging on the diode. The photodiode D1 is mounted in a housing (not shown) that prevents at least substantially all light, other than the light projected from the end 11 of the optical fiber, from impinging on it. The electrical processing circuit 4 comprises a transimpedance amplifier 32, which enables the amplifier 32 to convert current into voltage. The output of the photodiode D1 is an electrical current that is converted by the amplifier 32 into a voltage signal. The output of the photodiode D1 is connected to the inverting terminal (minus sign) of the amplifier 32. The amplifier 32 produces a voltage that is proportional to the current output from the photodiode D1. That output voltage is produced when the D1 current flows through the feedback resistor R1 to the output. The value of R1 may be, for example, 10, 000 ohms (10 kΩ). The capacitor, C1, in the feedback loop provides stability and prevents the output of the amplifier 32 from oscillating by filtering out high frequency noise. The value of C1 may be, for example, 100 Picofarads (pF).

The output voltage of the amplifier 32 passes through a resistor R3, which may be, for example, 1.6 KΩ. After the resistor R3, there is a parallel capacitor, C3, to ground. The value of the capacitor C3 may be, for example, 0.1 μF. This capacitor acts as a lowpass filter, which filters noise out of the output signal at the "Output+" terminal. The diode D2 provides a second reference voltage at the positive terminal of the amplifier 32, which eliminates the need for a second power supply for the amplifier. The reference voltage provided by D2 may be, for example, 1.235 volts. Thus, the circuit 4 utilizes a single 5-volt power supply 31 for the amplifier 32. The negative voltage supply terminal 33 is tied to ground, as shown. By biasing the reference voltage at the positive input terminal (plus sign) of the amplifier 32 up by 1.235 volts, the inputs of the amplifier 32 are prevented from being at the positive and/or negative rails of the amplifier 32, which is desirable for this particular amplifier 32 and for this particular implementation of the electrical processing circuitry 4. If the supplies of the amplifier 32 were allowed to go to the positive and negative rails, noise would be injected into the output signal of the amplifier and some linearity might be lost.

The +5 volt supply 36 is provided from the same voltage supply that supplies voltage to the amplifier 32. The capacitor C2 removes noise from the supply voltage 36. C2 may have a value of, for example, 0.1 microfarads (μF). R2 limits the current flowing through D2. The capacitor C4 is a bypass capacitor that stabilizes the 1.235 reference voltage at the positive input terminal of the amplifier 32. The value of the capacitor C4 may be, for example, 0.1 μF. The resistor R4 serves the purpose of matching the impedance of both output voltages "Output+" and "Output−". The value of the resistor R4 may be, for example, 1.6 KΩ.

Of course, the current output from the photodiode could be converted into voltage by using other implementations, such as by placing a resistor in series with the output of the photodiode D1 to convert the current into a voltage signal. However, the extra resistor may generate additional noise, which is undesirable. Also, if a separate negative supply voltage was tied to supply terminal 33 of the operational amplifier 32, the processing circuitry 4 would have a single output, as opposed to the two outputs shown. In this case, the components D2, R2, C2, R4 and C4 would not be required. However, the example embodiment shown in FIG. 3 provides a large dynamic range of outputs of the photodiode D1 and minimizes noise, which makes the processing circuitry 4 very precise. Also, a separate power supply would increase the costs associated with the processing circuitry 4 as well as the overall size of the processing circuitry 4. The example embodiment shown in FIG. 3 enables the processing circuitry 4 to be placed on a very small printed circuit board (not shown), with the photodiode D1 being the largest component on the board.

Once the alignment of the optical fiber end 11 with the input 15 of the waveguide of the PLC DUT 13 has been achieved, then the PER and/or PDL and/or other polarization measurements are obtained in accordance with the present invention. As indicated above, the present invention preferably is implemented in front of the input 15 of the waveguide 12 and after the output 14 of the waveguide 12. However, those skilled in the art will understand, in view of the discussion provided herein, that obtaining measurements at only either the input 15 or output 14 of the waveguide 12 would also be useful.

Due to the fact that it is too difficult to illustrate both of these measurement configurations in a single drawing (i.e., measurement at the input and output of the waveguide), FIG.

Figure 5:
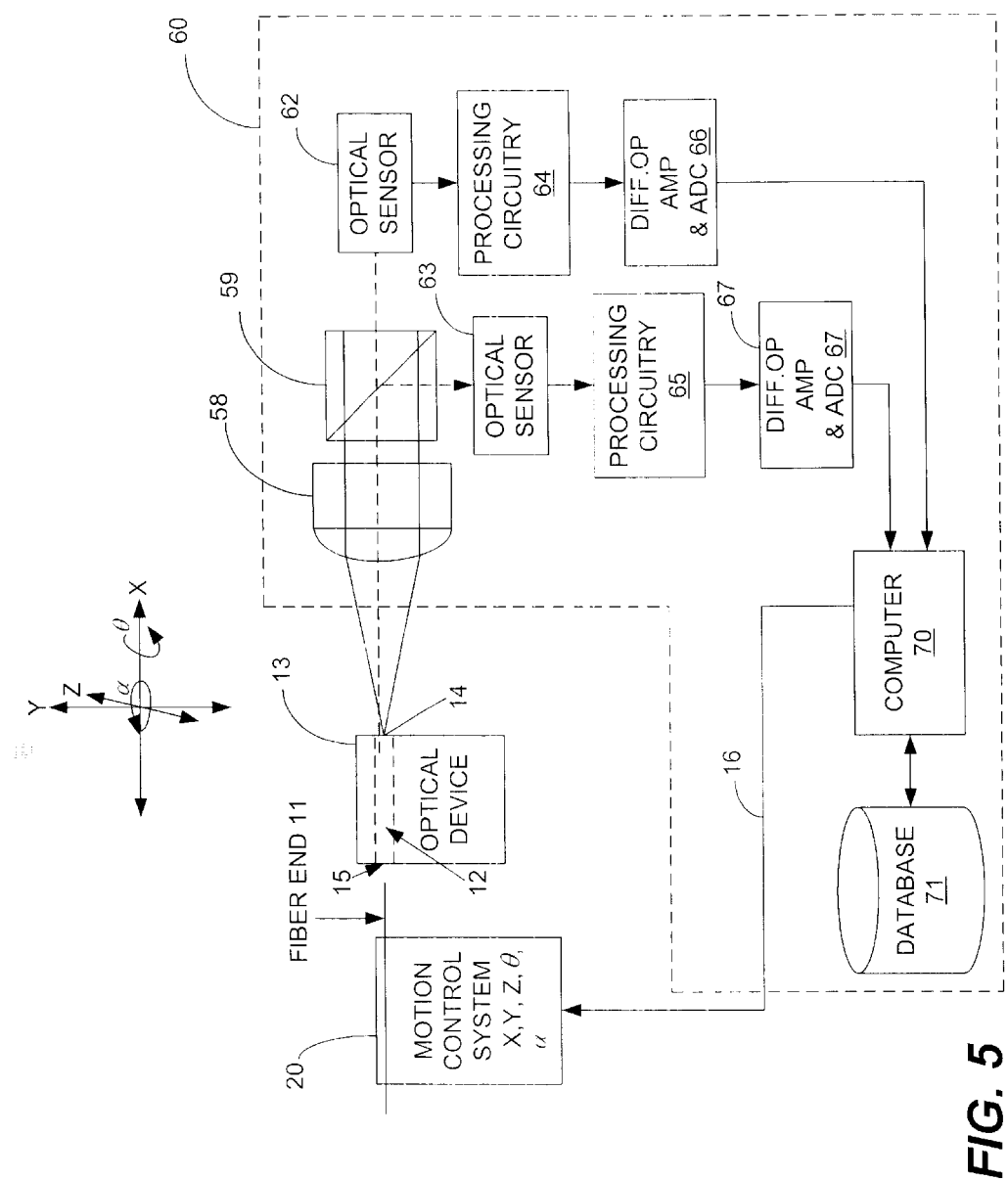
FIG. 5 is a block diagram of the measurement system of the present invention that analyzes the light output from the waveguide of the DUT to determine whether the waveguide is operating properly.

4 will be used to describe the measurements obtained at the end 11 of the optical fiber and FIG. 5 will be used to describe the measurements obtained at the output of the optical waveguide.

Figure 4:
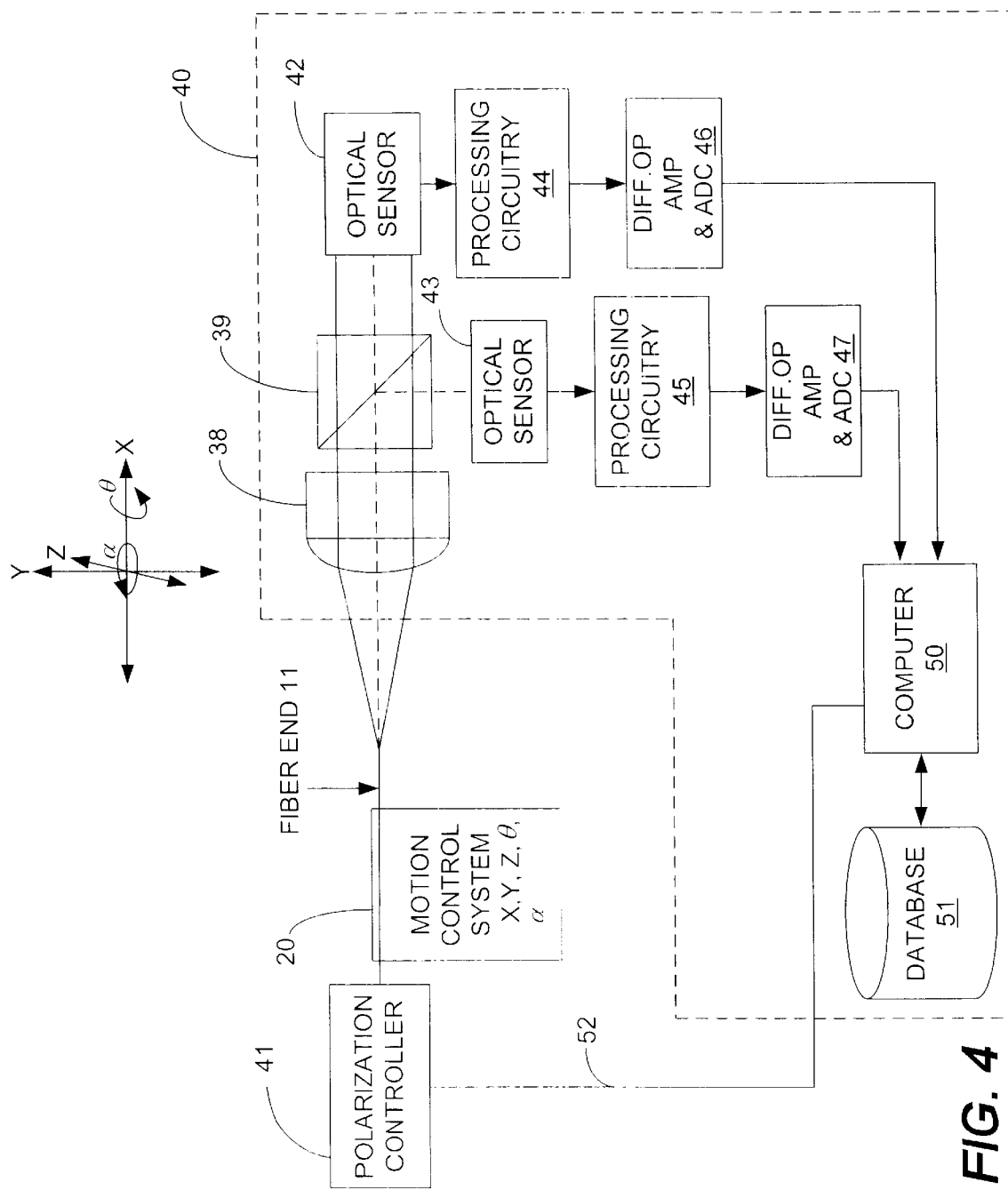
FIG. 4 is a block diagram of the measurement system of the present invention thatgenerates feedback signals that are used by the polarization controller to adjust the polarization state of light being output therefrom.

In FIG. 4, the measurement system 40 is used to provide feedback signals to the polarization controller 41 to ensure that the polarization state of the light being launched from the end 11 of the optical fiber into the input of the optical waveguide 12 is known and is controllable. Generally, the feedback signal is used by the polarization controller 41 to change the polarization state of the light output by the polarization controller in order to compensate for changes in the polarization state of the light caused by the optical fiber. For ease of illustration, the PLC DUT is not shown in FIG. 4. The motion control system 20 is shown to indicate that the fiber end 11 is being maintained at the position at which alignment with the input of the waveguide of the PLC DUT was achieved.

The motion control system 20 maintains the alignment of the fiber end 11 as the measurement system 40 analyzes the light and, if necessary, sends feedback signals to the polarization controller 41 to cause it to adjust the polarization state of the light output therefrom. The measurement system 40 utilizes components that may be, but need not be, identical to the components of the alignment system 10. For example, the optical sensors 3, 42 and 43 of FIGS. 1 and 4 may be identical. Similarly, the processing circuitry 4, 44 and 45 and the differential Op amp/ADC circuitry 5, 46, 47 of FIGS. 1 and 4 may also be identical. Therefore no further discussion of the operations of these components will be provided. The lenses 2 and 38 of FIGS. 1 and 4 may also be identical.

With reference again to FIG. 4, as the motion control system 20 maintains the alignment of the fiber end 11, the light output from the fiber end 11 is focused by the lens 38 onto the beam splitter 39. The beam splitter 39 separates the two different polarization components (e.g., horizontal and vertical) from each other and provides them to optical sensors 42 and 43, respectively. As stated above, the polarization components are initially angularly separated, but they are not necessarily orthogonal to each other. Components 44–47 perform the respective functions described above and the computer 50 receives the resulting digital signals from components 46 and 47 substantially simultaneously. The computer 50 then performs a PER and/or PDL determination algorithm and generates feedback signals 52 that are provided to the polarization controller 41. For example, the computer 50 may perform a PER determination algorithm by taking the digital signal corresponding to the light received by one of the sensors 42 or 43 and dividing it by the digital signal corresponding to the light received by the other one of the sensors 42 or 43. If the PER is not correct, or is not what was expected or desired, the computer 50 outputs a feedback signal 52 to the polarization controller 41, which causes the polarization controller 41 to adjust the polarization state of the light being output therefrom. For example, the power level corresponding to either or both of the polarization components may be adjusted so that these levels are equal when the light is launched from the end 11 of the fiber into the input of the waveguide. The feedback signals 52 may additionally (or alternatively) be based on the results of a PDL determination algorithm performed by computer 50 that determines the polarization-dependent loss that results when the light passes through the optical fiber.

As stated above, determining the PER enables the measurements to be normalized. For example, if the PER at both the optical fiber end 11 and at the output of the waveguide is 0.17, this shows that the waveguide has not modified the state of polarization, regardless of any coupling loss. Thus, using the ratio of the power of the polarization components enables a determination to be made as to whether and to what degree the waveguide has modified the polarization state without taking any coupling loss of the system into account.

FIG. 5 is a block diagram illustrating the system 60 that analyzes the polarization state of the light output from the waveguide output 14 of PLC DUT 13. The polarization controller has been left out of this drawing because it is assumed that the polarization controller has or is being adjusted as needed as light is being output from the waveguide 12 and analyzed. The motion control system 20 is shown to indicate that it maintains the end 11 of the optical fiber at the aligned position as light is launched from the optical fiber end 11 into the input 15 of the waveguide 12.

The light propagates through the waveguide 12 and is output at waveguide output 14. The lens 58 collimates the light and focuses the light beam on the sensors 62 and 63 through the beam splitter 59. The beam splitter 59 separates the respective polarization components and focuses each polarization component on one of the optical sensors 62 and 63. The components 62–67 preferably behave in an identical fashion and perform the same functions as their counterpart components in FIG. 4. Therefore, the operations performed by these components in FIG. 5 will not be described herein.

The computer 70 performs a PER and/or PDL determination algorithm that enables a determination to be made by the computer 70 as to whether the particular DUT 13, or a batch of a particular type of DUTs, is suitable for shipping to a customer. In this case, the PDL corresponds to the amount of insertion loss that varies as a function of the input polarization state of the light and that results from propagation of the light through the waveguide 12. PDL can cause signal degradation. Therefore, it is important to measure PDL to determine if the optical device is functioning properly. Known algorithms and techniques exist for determining PDL, several of which are described in the aforementioned '597 patent, which is incorporated herein in its entirety. Any of these known techniques or algorithms can be used to determine PDL in accordance with the present invention. Likewise, known techniques and algorithms exist for determining the PER. Furthermore, the separated polarization states can be analyzed in other ways to determine whether the waveguide is operating properly, as will be understood by those skilled in the art. Any of these techniques, or a combination thereof, may be used to accomplish the goals of the present invention.

In summary, the present invention (1) ensures that the end 11 of the optical fiber is properly aligned with the input of the optical waveguide of the DUT, (2) that the polarization controller is adjusted accordingly such that light launched from the end 11 of the optical fiber has a known polarization state, and (3) that the light output from the waveguide is analyzed properly to determine whether the waveguide modifies the polarization state of the light propagating through it. By performing these steps, the present invention ensures that the DUT is properly tested and evaluated to determine whether or not it is suitable for shipment to a customer.

It should be noted that the embodiments described herein are only examples of particular ways in which the present invention could be implemented. As stated above, the present invention is not limited to the particular implementation details illustrated in the drawings. For example, Many implementations of the processing circuitry could be derived that would perform the functions which need to be performed by the processing circuitry. Also, the present invention is not limited to any particular lens system for focusing the light output from the DUT onto the optical sensor. Moreover, the optical sensor of the present invention is not limited to any particular optical sensor. Preferably the optical sensor is a photodiode, such as a three millimeter (mm) photodiode. Preferably the lens is a plano convex lens that is 5.2 mm thick, 5.0 mm in diameter, that has a 10 mm focal length, and is anti-reflection coated at 1550 nanometers (nm). However, those skilled in the art will understand in view of the discussion provided herein that the present invention is not limited to any of these particular implementations and that many variations may be made to the example embodiments and components discussed herein that are within the scope of the present invention.

Also, it should be noted that although FIGS. 1, 4 and 5 depict separate components for performing the alignment and measurement operations, in order to avoid redundancy and decrease system costs, components in FIGS. 1, 4 and 5 that perform the same functions may be shared to perform the alignment and measurement operations. For example, a single computer and database, such as that shown in FIGS. 1, 4 and 5, may be connected to each of the systems 10, 40 and 60 and programmed to execute each of the aforementioned algorithms. Those skilled in the art will understand how other modifications can be made to the embodiments discussed above, and that all such modifications that utilize the concepts, principals and goals of the present invention are within the scope of the invention.

What is claimed is:

1. A system for testing an optical device under test (DUT), the DUT comprising at least one optical waveguide, said at least one optical waveguide having an input and an output, the system comprising:

a polarization controller for generating a beam of light having a particular polarization state, wherein the beam of light generated by the polarization controller is coupled into a proximal end of an optical fiber, the beam of light coupled into the proximal end of the optical fiber is output from a distal end of the optical fiber, and the beam of light output from the distal end of the optical fiber is coupled into an input of an optical waveguide of a DUT;

a lens positioned to receive light generated by the polarization controller and output from an output of the optical waveguide;

a beam splitter positioned to receive light focused thereon by the lens, the beam splitter separating the light into separate polarization components;

a first optical sensor positioned to receive a first one of said separate polarization components directed onto the optical sensor by the beam splitter, the first optical sensor converting the first one of said separate polarization components into corresponding electrical signals;

a second optical sensor positioned to receive a second one of said separate polarization components directed onto the second optical sensor by the beam splitter, the second optical sensor converting the second one of said separate polarization components into corresponding electrical signals; and processing logic, the processing logic receiving the electrical signals from the first and second optical sensors and processing the electrical signals in accordance with a measurement algorithm to determine a polarization state of the light output from the distal end of the optical fiber, the processing logic generating a polarization feedback signal that is sent to the polarization controller to cause the polarization controller to adjust the polarization state of the light being generated thereby to compensate for changes in the polarization state of the light caused by the optical fiber.

2. The system of claim 1, wherein the processing logic includes an analog-to-digital converter (ADC) and a computer, the ADC converting the electrical signals into digital signals suitable for processing by the computer, and wherein the computer executes a polarization extinction ratio (PER) algorithm that processes the digital signals and determines a polarization extinction ratio (PER) of light output from the polarization controller, the computer determining whether and how much the polarization controller needs to be adjusted based on the determined PER.

3. The system of claim 1, wherein the processing logic will continue to generate and send feedback signals to the polarization controller to cause the state of polarization of light output from the polarization controller to be adjusted until the state of polarization of light output from the polarization controller generates a desired state of polarization at the distal end of the optical fiber.

4. The system of claim 1, wherein the processing logic includes an analog-to-digital converter (ADC) and a computer, the ADC converting the electrical signals into digital signals suitable for processing by the computer, and wherein the computer executes a polarization-dependent loss (PDL) algorithm that processes the digital signals and determines the PDL caused by the optical fiber, the computer determining whether and how much the polarization controller needs to be adjusted based on the determined PDL.

5. The system of claim 1, wherein the first and second optical sensors are first and second photodiodes, respectively.

6. The system of claim 1, wherein the processing logic includes a first and second processing circuit and a first and second analog-to-digital converter (ADC), and a computer, the first and second processing circuits processing the electrical signals from the first and second optical sensors, respectively, the first and second ADCs converting the electrical signals from the first and second optical sensors, respectively, into a first set of digital signals and a second set of digital signals, the computer processing the first and second sets of digital signals to determine whether and how much the polarization controller should be adjusted.

7. The system of claim 6, wherein if, after processing the first and second sets of digital signals the computer determines that the light output from the distal end of the optical fiber does not have a desired polarization state, the computer generates a feedback signal that is sent to the polarization controller to cause the polarization controller to adjust the polarization state of light being generated thereby and output into the proximal end of the optical fiber.

8. The system of claim 7, wherein the computer executes a polarization extinction ratio (PER) algorithm that processes the first and second sets of digital signals and determines a polarization extinction ratio (PER) of light output from the polarization controller, the computer determining whether and how much the polarization controller should be adjusted based on the determined PER.

9. The system of claim 7, wherein the computer will continue to generate and send feedback signals to the polarization controller to cause the state of polarization of light output from the polarization controller to be adjusted until the polarization state of light output from the polarization controller generates a desired polarization state at the distal end of the optical fiber.

10. The system of claim 7, wherein the computer executes a polarization-dependent loss (PDL) algorithm that processes the first and second sets of digital signals and determines a polarization-dependent loss (PDL) with respect to light output from the polarization controller and light output from the distal end of the optical fiber, the computer determining whether and how much the polarization controller should be adjusted based on the determined PDL.

11. A system for testing an optical device under test (DUT) to determine whether the DUT is operating properly, the system comprising:

a lens positioned at the output of a waveguide of the DUT to receive light generated by a polarization controller and coupled into an input of the waveguide of the DUT by an optical fiber, the optical fiber having a proximal end into which light from the polarization controller is coupled and a distal end from which light generated by the polarization controller is coupled into the input of the waveguide, the light coupled into the input of the waveguide from the distal end of the optical fiber having a known polarization state that is automatically measured and that is automatically changed, if necessary, by automatically adjusting the polarization controller based on the automatically measured known polarization state of light output from the distal end of the optical fiber;

a beam splitter positioned to receive light from the output of the waveguide that is focused on the beam splitter by the lens, the beam splitter separating the light into separate polarization components;

a first optical sensor positioned to receive a first one of the separated polarization components directed onto the optical sensor by the beam splitter and to convert the light corresponding to the first one of the polarization components into electrical signals;

a second optical sensor positioned to receive a second one of the separated polarization components directed onto the second optical sensor by the beam splitter and to convert the light corresponding to the second one of the polarization components into electrical signals; and processing logic, the processing logic receiving the electrical signals from the first and second optical sensors and processing the electric signals in accordance with a polarization state measurement algorithm to determine any effect the waveguide had on the polarization state of the light coupled into the waveguide, the processing logic generating a polarization feedback signal that is sent to the polarization controller to cause the polariation controller to adjust the polarization state of the light being generated thereby to compensate for changes in the polarization state of the light caused by the optical fiber.

12. The system of claim 11, wherein the processing logic includes an analog-to-digital converter (ADC) and a computer, the ADC converting the electrical signals into digital signals suitable for processing by the computer, and wherein the computer executes an polarization extinction ratio (PER) algorithm that processes the digital signals and determines a polarization extinction ratio (PER) of light output from the output of the waveguide of the DUT, the computer determining said any effect based on the determined PER.

13. The system of claim 11, wherein the processing logic includes an analog-to-digital converter (ADC) and a computer, the ADC converting the electrical signals into digital signals suitable for processing by the computer, and wherein the computer executes a polarization-dependent loss (PDL) algorithm that processes the digital signals and determines the PDL caused by the waveguide of the DUT, the computer determining said any effect based on the determined PDL.

14. The system of claim 11, wherein the first and second optical sensors are first and second photodiodes, respectively.

15. The system of claim 11, wherein the processing logic includes first and second processing circuits, first and second analog-to-digital converters (ADCs), and a computer, the first and second processing circuits processing the electrical signals from the first and second optical sensors, respectively, the first and second ADCs converting the electrical signals from the first and second optical sensors, respectively, into a first set of digital signals and a second set of digital signals, the computer processing the first and second sets of digital signals in accordance with a polarization state measurement algorithm to determine said any effect.

16. The system of claim 15, wherein the polarization state measurement algorithm is a polarization extinction ratio (PER) algorithm that processes the first and second sets of digital signals and determines a polarization extinction ratio (PER) of light output from the output of the waveguide of the DUT, the computer determining said any effect based on the determined PER.

17. The system of claim 15, wherein the polarization state measurement algorithm is a polarization-dependent loss (PDL) algorithm that processes the first and second sets of digital signals and determines the PDL caused by the waveguide and determines said any effect based on the determined PDL.

18. A method for testing an optical device under test (DUT), the method comprising the steps of:

generating a beam of light having a particular polarization state with a polarization controller, the polarization controller coupling light into a proximal end of an optical fiber, the light coupled into the proximal end of the optical fiber being output from a distal end of the optical fiber, the light output from the distal end of the optical fiber being coupled into an input of an optical waveguide of an optical DUT;

focusing light generated by the polarization controller and output from an output of the optical waveguide, the light focussed onto a beam splitter using a lens, the beam splitter separating the light into separate polarization components;

receiving a first one of the separated polarization components from the beam splitter with a first optical sensor and converting the light corresponding to the first one of the polarization components into corresponding electrical signals;

receiving a second one of the separated polarization components from the beam splitter with a second optical sensor and converting the light corresponding to the second one of the polarization components into corresponding electrical signals;

processing the electrical signals with processing logic that receives the electrical signals from the first and second optical sensors in accordance with a polarization state measurement algorithm to determine a polarization state of the light output from the distal end of the optical fiber; and compensating for changes in the polarization state of the light caused by the optical fiber, wherein compensating for chances further comprises sending a polarization feedback signal to the polarization controller to cause the polarization controller to adjust the polarization state of the light being generated thereby.

19. The method of claim 18, wherein the processing logic includes an analog-to-digital converter (ADC) and a computer, the ADC converting the electrical signals into digital signals suitable for processing by the computer, and wherein during the processing step the computer executes an polarization extinction ratio (PER) algorithm that processes the digital signals and determines the PER of light output from the polarization controller, and wherein the computer determines whether and how much to adjust the polarization controller based on the determined PER.

20. The method of claim 18, wherein the processing logic will continue to generate and send feedback signals to the polarization controller to cause the state of polarization of light output from the polarization controller to be adjusted until the light output from the distal end of the optical fiber has a desired polarization state.

21. The method of claim 18, wherein the processing logic includes an analog-to-digital converter (ADC) and a computer, the ADC converting the electrical signals into digital signals suitable for processing by the computer, and wherein during the processing step, the computer executes the polarization state measurement algorithm, the polarization state measurement algorithm corresponding to a polarization-dependent loss (PDL) algorithm that processes the digital signals and determines the PDL caused by the optical fiber, and wherein the computer determines whether and how much to adjust the polarization controller based on the determined PDL.

22. The method of claim 18, wherein the first and second optical sensors are first and second photodiodes, respectively.

23. The method of claim 18, wherein the processing logic includes a first and a second processing circuit and a first and a second analog-to-digital converter (ADC), and a computer, the first and second processing circuits processing the electrical signals from the first and second optical sensors, respectively, the first and second ADCs converting the electrical signals from the first and second optical sensors, respectively, into a first set of digital signals and a second set of digital signals, and wherein during the computer processes the first and second sets of digital signals in accordance with the polarization state measurement algorithm to determine whether and how much to adjust the polarization controller.

24. The method of claim 23, wherein if, after processing the first and second sets of digital signals the computer determines that the light output from the distal end of the optical fiber does not have a desired polarization state, the computer generates a feedback signal that is sent to the polarization controller to cause the polarization controller to adjust the polarization state of light being generated thereby and coupled into the proximal end of the optical fiber.

25. The method of claim 24, wherein the polarization state measurement algorithm executed by the computer is a polarization extinction ratio (PER) algorithm that processes the first and second sets of digital signals and determines the PER of light output from the distal end of the optical fiber, and wherein the computer determines whether and how much to adjust the polarization controller based on the determined PER.

26. A method for testing an optical device under test (DUT), the method comprising the steps of:

generating a beam of light having a particular polarization state with a polarization controller, the polarization controller coupling the light into a proximal end of an optical fiber, the light coupled into the proximal end of the optical fiber being output from a distal end of the optical fiber and coupled into an input of an optical waveguide of the DUT;

focusing light received from an output of the optical waveguide with a lens onto a beam splitter, the beam splitter separating the light into separate polarization components;

receiving a first one of the separated polarization components with a first optical sensor and converting the light corresponding to the first one of the separated polarization components into corresponding electrical signals;

receiving a second one of the separated polarization components with a second optical sensor and converting the light corresponding to the second one of the separated polarization components into corresponding electrical signals;

processing the electrical signals in processing logic that receives the electrical signals from the first and second optical sensors and processes the electrical signals in accordance with a polarization state measurement algorithm to determine any effect the waveguide of the DUT has on the light coupled into the input of the waveguide; and compensating for changes in the polarization state of the light caused by the optical fiber, wherein the changes are compensated by sending a polarization feedback signal to the polarization controller to cause the polarization controller to adjust the polarization state of the light being generated thereby.

27. The method of claim 26, wherein the processing logic includes an analog-to-digital converter (ADC) and a computer, the ADC converting the electrical signals into digital signals suitable for processing by the computer, the computer executing the polarization state measurement algorithm, the polarization state measurement algorithm corresponding to a polarization extinction ratio (PER) algorithm that processes the digital signals and determines the PER of light output from the output of the waveguide of the DUT, and wherein the computer determines said any effect based on the determined PER.

28. The method of claim 26, wherein the processing logic includes an analog-to-digital converter (ADC) and a computer, the ADC converting the electrical signals into digital signals suitable for processing by the computer, and wherein the during the processing step, the computer executes the polarization state measurement algorithm, the polarization state measurement algorithm corresponding to a polarization-dependent loss (PDL) algorithm that processes the digital signals and determines the PDL caused by the waveguide of the DUT, and wherein the computer determines said any effect based on the determined PDL.

29. The method of claim 26, wherein the first and second optical sensors are first and second photodiodes, respectively.

30. The method of claim 26, wherein the processing logic includes a first and second processing circuit and a first and second analog-to-digital converter (ADC), and a computer, the first and second processing circuits processing the electrical signals from the first and second optical sensors, respectively, the first and second ADCs converting the electrical signals from the first and second optical sensors, respectively, into a first set of digital signals and a second set of digital signals, and wherein during the processing step, the computer processes the first and second sets of digital signals in accordance with the polarization state measurement algorithm to determine said any effect.

31. The method of claim 30, wherein the polarization state measurement algorithm executed by the computer is a polarization extinction ratio (PER) algorithm, and wherein the computer processes the first and second sets of digital signals in accordance with the PER algorithm and determines the PER associated with light output from the output of the waveguide of the DUT, and wherein the computer determines said any effect based on the determined PER.

32. The method of claim 30, wherein the polarization state measurement algorithm executed by the computer is a polarization dependent loss (PDL) algorithm that processes the first and second sets of digital signals and determines the PDL caused by the waveguide, and wherein the computer determines said any effect based on the determined PDL.

33. The system of claim 1, further comprising a motion controller for aligning the distal end of the optical fiber with the input of the optical waveguide.

34. The system of claim 33, wherein the processing logic generates an alignment feedback signal that is sent to the motion controller to cause the motion controller to adjust the alignment of the distal end of the optical fiber with respect to the input of the optical waveguide.

35. The method of claim 18, further comprising aligning the distal end of the optical fiber with the input of the optical waveguide.

36. The method of claim 35, further comprising sending an alignment feedback signal from the processing logic to a motion controller for adjusting the alignment of the distal end of the optical fiber with the input of the optical waveguide.

* * * * *